United States Patent [19]

Isaac et al.

[11] Patent Number: 4,865,326

[45] Date of Patent: Sep. 12, 1989

[54] OPTICAL BRIGHTNERS IN GOLF BALL CLEAR COATINGS

[75] Inventors: Sharon R. Isaac, Acushnet; Kevin M. Harris, New Bedford, both of Mass.

[73] Assignee: Acushnet Company, New Bedford, Mass.

[21] Appl. No.: 100,771

[22] Filed: Sep. 24, 1987

[51] Int. Cl.$^4$ .............................................. A63B 37/12
[52] U.S. Cl. .................... 273/235 A; 273/DIG. 008; 273/DIG. 022; 273/DIG. 024; 252/301.21
[58] Field of Search ...................... 252/301.21, 301.22, 252/301.23, 301.24, 301.25, 301.26, 301.27, 301.28, 301.29, 301.30, 301.31, 301.32; 273/233, 234, 235 A, 235 R, 235 B, 220, 218, 213, 62; 524/110

[56] References Cited

U.S. PATENT DOCUMENTS

| | | | |
|---|---|---|---|
| 3,961,965 | 6/1976 | Zwahlen | 252/301.34 |
| 4,204,879 | 5/1980 | Paskins et al. | 8/582 |
| 4,442,282 | 4/1984 | Kolycheck | 528/83 |
| 4,679,794 | 7/1987 | Yamada et al. | 273/235 R |
| 4,679,795 | 7/1987 | Melvin et al. | 524/110 |
| 4,798,386 | 1/1989 | Berard | 273/235 R |

FOREIGN PATENT DOCUMENTS

| | | |
|---|---|---|
| 0065638 | 5/1979 | Japan. |
| 835719 | 5/1960 | United Kingdom. |
| 862645 | 3/1961 | United Kingdom. |
| 1014651 | 12/1965 | United Kingdom. |
| 1243479 | 9/1971 | United Kingdom. |

*Primary Examiner*—John F. Niebling
*Assistant Examiner*—Steven P. Marquis
*Attorney, Agent, or Firm*—Lucas & Just

[57] ABSTRACT

An improvement in the appearance of golf balls is disclosed. The "clear coat," i.e. the transparent coat which is the last put on to the outer surface of the golf ball, has included in it an optical brightener, preferably one selected from the group consisting of stilbene derivatives, styryl derivatives of benzene and biphenyl, bis(benzazol-2-yl) derivatives, coumarins, carbostyrils, naphthalimides, derivatives of dibenzothiophene-5,5-dioxide, pyrene derivatives, and pyridotriazoles. Substantial improvements in appearance of the golf ball are obtained.

10 Claims, No Drawings

OPTICAL BRIGHTNERS IN GOLF BALL CLEAR COATINGS

The present invention relates to improvements in clear coats and, more particularly, to the improved appearance of golf balls which have clear coats containing optical brighteners, especially those selected from the group consisting of stilbene derivatives, styryl derivatives of benzene and biphenyl, bis(benzazol-2-yl) derivatives, coumarins, carbostyrils, naphthalimides, derivatives of dibenzothiophene-5,5-dioxide, pyrene derivatives, and pyridotriazoles.

From at least as early as the 1930's until about the early 1980's, golf balls were finished by applying a series of coats of paint or the like to the outer surface thereof. A typical finishing operation involved the applying of an opaque primer followed by a second opaque layer, usually white, commonly called a "top coat." After the top coat was applied, identifying indicia such as a trademark, an identifying number, a model number, and the like were stamped on the ball. Because these stampings are by their nature non-durable, one or two "clear coats" were typically applied to the top of the golf ball. Where two clear coats are used, the first is usually a primer. The final clear coat, the outermost coating on the ball, is referred to as the finish coat. The clear coats are characterized by being glossy, transparent and free or substantially free of pigment. In addition to protecting the indicia stamped or otherwise affixed to the outer surface of the top coat, they also imparted a glossy finish to the ball which substantially improved its appearance. The finish coat in some instances contained a trace amount of optical brightener, i.e. below 0.01% by weight of the resin solids of the finish coat. However, this trace amount of optical brightener has little effect on the brightness of the golf ball.

In the early 1980's there was introduced to the golf world the concept of colored golf balls, notably of orange color and yellow color. The color was applied as the top coat of the paint system. The coloring material was, virtually universally, a paint containing a fluorescent material. Fluorescent materials are species of the generic term optical brightener.

After application of the fluorescent paint, trademarks and other indicia were stamped in traditional manner and then the golf balls were covered with one or more clear coats as previously described.

In about the early 1980's, a co-worker of the applicant herein discovered that the step of applying an opaque coating to the surface of the fluorescent golf balls could be eliminated by incorporating the fluorescent material in the cover molded onto the golf ball core. This is generally referred to in the art, and is referred to herein, as a pigmented golf ball. The invention of my co-worker is taught in British Patent No. 2,121,294B of Jan. 4, 1983, the pertinent portions of such teaching being incorporated herein by reference. Other workers involved in the golf ball industry have subsequently included other optical brighteners in the cover molded onto the golf ball core, as taught, for example, in British patent application No. 2,144,045A. The British patent teaches the use of a range of 0.001% to 0.5% optical brightener based on the weight of the cover stock. In actual practice, in order to have a ball of relatively bright appearance, it is necessary to use about 0.10%–0.15%. This requires the use of approximately 10 to 15 grams per 1000 golf balls.

When an optical brightener such as a fluorescent material is incorporated into the cover of the ball, there is no need for any opaque coating. However, to add gloss and otherwise enhance the appearance of the ball and to protect the trademark and other applied indicia, one or more clear coats are still applied to the outermost surface of the golf ball. While these balls have a very pleasing and bright appearance, they are also comparatively expensive to manufacture. The reason for this is that fluorescent materials and other optical brighteners are expensive as compared to most other components in a golf ball.

The applicant has now discovered that a golf ball with a very bright finish can be made at substantially less cost than has hereto been possible. The applicant accomplishes this by incorporating a substantial amount of an optical brightener into the outermost clear coat. By incorporating at least 0.3% optical brightener by weight of resin solids into the outermost clear coat, the need for an optical brightener in the cover stock is eliminated. Economic advantage is obtained because only a small amount of optical brightener per ball is required when the optical brightener is applied in the clear coat; results comparable to those obtained with optical brightener incorporated in the cover stock at a level of 10 grams per 1000 balls have been obtained with as little as 0.25 grams (0.2%) of optical brightener per 1000 golf balls when the optical brightener is incorporated in the finish clear coat. While the economic saving is small on a per ball basis, it is quite substantial when applied to the many millions of dozens of golf balls sod today.

In addition to the economic saving by incorporating the optical brightener in the clear coat, there is also a substantial improvement in the appearance of the ball. It has long been accepted in the industry that a clear coat enhances the gloss and finish of the golf ball. However, the applicant herein has found that with balls containing an optical brightener, the clear coat actually detracts from the brightness of the ball. This is true whether the optical brightener is applied in a paint or is incorporated into the cover material. By incorporating the optical brightener into the clear coat as taught herein, substantial improvement in brightness of the ball is obtained, whether the ball is painted or pigmented.

The term clear coat means a coating applied to the outer surface of the golf ball which is transparent and imparts gloss to the ball. Clear coats are generally free of pigmentation and have the appearance of water. However, they can contain small amounts of dye or pigment so long as they are still transparent. Clear coat materials are well known in the golf ball art. They are generally either epoxies or urethanes. Where a clear primer is used, it is usually an epoxy or a one pack urethane. The finish clear coat is generally a two pack polyurethane, consisting of separate packages of the polyol and the diisocyanate. We prefer to admix the optical brightener in the polyol before the polyol and the diisocyanate are combined.

The term optical brightener as used herein is generally the same as that set forth in Kirk-Othmer, *Encyclopedia of Chemical Technology, 3d Edition,* Volume 4, page 213. As there stated, optical brighteners absorb the invisible ultra-violet portion of the daylight spectrum and convert this energy into the longer-wavelength visible portion of the spectrum. Kirk-Othmer describes typical optical brighteners, including stilbene derivatives, styryl derivatives of benzene and biphenyl, bis(- benzazol-2-yl) derivatives, coumarins, carbostyrils, naphthalimides, derivatives of dibenzothiophene-5,5-dioxide, pyrene derivatives, and pyridotriazoles. In accordance with the present invention, any of these or other known optical brighteners may be used, alone or in combination, so long as they are compatible with each other and with the clear coat in which they are used. Examples of specific optical brighteners are derivatives of 4,4'-diamino stilbene-2,2'-disulfonic acid, 4-methyl-7-diethylamino coumarin and 2,5-bis(5-tert-butyl)-2-benzoxazolyl) thiophene, of which the latter is the preferred optical brightener for use in the present invention.

The amount of optical brightener to be included in the outermost coating on the ball is largely a matter of choice. The amount can range anywhere from the minimum 0.3% level to 2% or more by weight of the resin solids in the clear coat. We have found an amount of about 0.6-0.8% by weight resin solids to be a very desirable amount and most prefer an amount of about 0.75%. With 0.75%, a very bright ball is obtained. While the brightness can be made even a little greater by adding a greater amount of optical brightener, the cost-benefit ratio decreases rapidly above 0.8%.

The maximum amount of optical brightener which can be used is limited by the amount of optical brightener which can be dissolved in the clear coat resin system. Because these resin systems are typically high in solids content, i.e. on the order of 35-60% solids with the balance being a carrier therefor, the amount of optical brightener which can be added is typically quite small. In our experience, the maximum amount that has been found soluble has been less than 2% by weight of the solids in the resin system, and is generally about 1% or lower.

These and other features of the present invention may be more fully understood with reference to the examples set forth hereinbelow.

EXAMPLES

There are a number of similarities between the specific examples set out hereinafter.

The golf ball cover material which dominates the market today is Surlyn. While other cover materials such as balata and polyurethane are sometimes used, Surlyn is by far the most widely used. Except as otherwise indicated in a specific example, the golf ball had a cover of a Surlyn ionomer resin.

Where a ball is indicated as "painted," there had been applied to the surface of the golf ball, except as otherwise indicated, an opaque primer coat and an opaque top coat.

Where a ball is indicated as "pigmented," the golf ball color is incorporated directly into the cover of the golf ball and, importantly, no opaque coating is applied to the surface of the golf ball (this distinction is made since painted golf balls may also have coloring material, notably titanium dioxide, incorporated into the cover stock). The coloring material used was titanium dioxide where the color is white, a fluorescent dye where the color is yellow and a fluorescent pigment where the color is orange. Many of the pigmented golf balls included an optical brightener. Where present, the amount of optical brightener is set forth as a percentage by weight of the cover composition.

Whether painted or pigmented, the golf balls, except as otherwise indicated, had one or more clear coats on the outer surface thereof. These clear coats typically were a primer and a finish coat, each of which was a clear, transparent polyurethane. The clear coats had a 50% by weight resin solids content. In some of the examples the outermost clear coat also included an optical brightener. Where present, the amount of optical brightener is set forth as a percentage by weight of the solids content of the optical brightener. Except as otherwise indicated, the optical brightener was Ciba-Geigy's Uvitex O.B., which is a butyl-benzoxazole derivative chemically known as 2,5-bis(5-tert-butyl-2-benzoxazolyl) thiophene.

The applicant knows of no standard test in the golf ball industry which measures the relative brightness of golf balls. However, the applicant has developed what it calls the SIVR, an internal comparative test which it employs. In the SIVR, a visual comparison of golf balls is made and the balls are compared on an arbitrary scale of 0 through 10, with 0 being the least bright and 10 being the most bright. The 0 value was assigned to a standard commercial golf ball which was pigmented white and clear coated in standard manner and contained no optical brightener. It will thus be appreciated that a rating of 0 is not an indication of no brightness or no gloss; it is simply a value arbitrarily assigned as just described. It will also be appreciated that, since there is no assigned value below 0, balls with a 0 rating can range from very dull to quite glossy. At the other end of the spectrum is the high value of 10. This value was arbitrarily assigned to a golf ball whose outermost clear coat included an optical brightener at the level of 0.75% by weight of the solids content of that coating. Since greater amounts of optical brightener can be used in the clear coat and will, as previously described, enhance brightness even a little more, the 10 value also includes a range of brightness. The 0 through 10 range was selected because it gives a broad differential between the 0 and 10 values as previously specified, and these two values are of primary interest in the present application. Because the values are assigned visually, there may be some variance from observer to observer. However, it is believed that the relative positions of the balls set forth in the examples below will fall in the same relative position regardless of the particular observer.

EXAMPLE I

White pigmented golf balls were made. The cover contained 2% titanium dioxide and 0.017% Ultramarine blue by weight of the cover stock. A clear polyurethane primer coat was applied, and on top of that a finish polyurethane clear coat was applied. The finish clear coat was the outermost coating applied to the golf ball and contained 0.75% optical brightener. The golf balls had a very bright and glossy appearance and had an SIVR of 10.

EXAMPLE II

Example I was repeated except that the level of optical brightener was 0.3%. The ball had a bright and glossy finish and an SIVR of 4.

EXAMPLE III

Example I was repeated except that the level of optical brightener was 1.0%. The ball had a very bright and glossy finish and an SIVR of 10.

EXAMPLE IV

As a comparison, a golf ball was made as in Example I except that there was no optical brightener in the clear coat. While the ball was glossy, it was not bright and had an SIVR of 0.

EXAMPLE V

Example IV was repeated except that an optical brightener was included in the cover material at a level of 0.14%. This ball was tested both before and after application of the clear coating. Before application of the clear coating, the ball had a very bright, glossy appearance and an SIVR of 10. After application of the clear coating, the golf ball still had a glossy and moderately bright appearance. However, its SIVR had dropped to 3.

EXAMPLE VI

Golf balls having a cover of balata were made. A white polyurethane primer was applied followed by a top coat of white polyurethane. After the trademark and other indicia were stamped on the ball, a clear coat was applied as the outermost coat. The clear coat had a trace amount of optical brightener, viz. less than 0.01%. The golf ball had a glossy appearance but was not very bright. It had an SIVR of 1.

EXAMPLE VII

Example VI was repeated except that optical brightener was included in the clear coat in the amount of 0.3%. The ball had a bright and glossy finish and an SIVR of 4.

EXAMPLE VIII

Example VI was repeated except that optical brightener was included in the clear coat in the amount of 0.75%. The ball had a very bright and glossy finish and an SIVR of 10.

EXAMPLE IX

Example I is repeated with Sandoz's Leucopure EGM, a coumarin derivative chemically known as 7-(2h-naphthol (1,2-d)-triazol-2-yl)-3-phenyl coumarin. Comparable results are obtained.

EXAMPLE X

Example I is repeated with Phorwhite K-2002, a pyrazoline derivative from Mobay. Comparable results are obtained.

It will be understood that the claims are intended to cover all changes and modifications of the preferred embodiments of the invention herein chosen for the purpose of illustration which do not constitute departures from the spirit and scope of the invention.

What is claimed is:

1. A golf ball comprising a cover and a clear coat applied as the outermost coat of said cover, the clear coat having at least about 0.3% by weight of the solids content of the clear coat of one or more optical brighteners selected from the group consisting of stilbene derivatives, styryl derivatives of benzene and biphenyl, bis(benzazol-2-yl) derivatives, cumarins, carbostyrils, naphthalimides, derivatives of dibenzothiophene-5,5-dioxide, pyrene derivatives of dibenzothiophene-5,5-dioxide, pyrene derivatives, and pyridotriazoles.

2. The golf ball of claum 1 wherein the optical brightener is present in the amount of 0.3–1.0% by weight of the solids content of the clear coat.

3. The golf ball of claim 1 wherein the optical brightener is present in the amount of 0.6–0.8% by weight of the solids content of the clear coat.

4. The golf ball of claim 1 wherein the optical brightener is present in the amount of 0.75% by weight of the solids content of the clear coat.

5. The golf ball of claim 1 wherein the optical brightener is a butyl benzoxazole.

6. The golf ball of claim 5 wherein the optical brightener is 2,5-bis(5-tert-butyl-2-benzoxazolyl) thiophene.

7. In a golf ball comprising a cover and a clear coat applied as the outermost coat of said cover, the improvement comprising the inclusion of an optical brightener in the amount of at least 0.3% by weight of the solids content of the clear coat.

8. The golf ball of claim 7 wherein the optical brightener is present in the amount of 0.3–1.0% by weight of the solids content of the clear coat., 9. The golf ball of claim 7 wherein the optical brightener is present in the amount of 0.6–0.8% by weight of the solids content of the clear coat.

10. The golf ball of claim 7 wherein the optical brightener is present in the amount of 0.75% by weight of the solids content of the clear coat.

* * * * *

UNITED STATES PATENT AND TRADEMARK OFFICE
CERTIFICATE OF CORRECTION

PATENT NO. : 4,865,326
DATED : September 12, 1989
INVENTOR(S) : Sharon R. Isaac and Kevin M. Harris It is certified that error appears in the above-identified patent and that said Letters Patent is hereby corrected as shown below:

Title Page:
In the title, change "BRIGHTNERS" to --BRIGHTENERS-- as it appears on the title page and at the beginning of column 1;

Column 2, line 31, change "sod" to --sold--;

Claim 1, lines 9-10, delete "of dibenzothiophene-5,5-dioxide, pyrene derivatives"; and Claim 2, line 1, change "claum" to --claim--.

Signed and Sealed this

Seventh Day of August, 1990

Attest:

HARRY F. MANBECK, JR.

*Attesting Officer*        *Commissioner of Patents and Trademarks*

REEXAMINATION CERTIFICATE (1534th)
United States Patent [19]
Isaac et al.

[11] B1 4,865,326
[45] Certificate Issued  Aug. 13, 1991

[54] OPTICAL BRIGHTENERS IN GOLF BALL CLEAR COATINGS

[75] Inventors: Sharon R. Isaac, Acushnet; Kevin M. Harris, New Bedford, both of Mass.

[73] Assignee: Acushnet Company

Reexamination Request:
No. 90/001,953, Mar. 9, 1990

Reexamination Certificate for:
Patent No.: 4,865,326
Issued: Sep. 12, 1989
Appl. No.: 100,771
Filed: Sep. 24, 1987

[51] Int. Cl.$^5$ .............................. A63B 37/12
[52] U.S. Cl. .................... 273/235 A; 273/DIG. 8; 273/DIG. 22; 273/DIG. 24; 252/301.21
[58] Field of Search ............ 252/301.21, 301.22, 252/301.23, 301.24, 301.25, 301.26, 301.27, 301.28, 301.29, 301.30, 301.31, 301.32; 273/233, 234, 235 A, 235 R, 235 B, 220, 218, 213, 62; 524/110

[56] References Cited

U.S. PATENT DOCUMENTS 4,679,795  7/1987  Melvin et al. ............... 273/235 R

FOREIGN PATENT DOCUMENTS 109647  8/1985  Japan.
168855  10/1986  Japan.

Primary Examiner—John F. Niebling

[57] ABSTRACT

An improvement in the appearance of golf balls is disclosed. The "clear coat," i.e., the transparent coat which is the last put on to the outer surface of the golf ball, has included in it an optical brightener, preferably one selected from the group consisting of stilbene derivatives, styryl derivatives of benzene and biphenyl, bis(benzazol-2-yl) derivatives, coumarins, carbostyrils, naphthalimides, derivatives of dibenzothiophene-5,5-dioxide, pyrene derivatives, and pyridotriazoles. Substantial improvements in appearance of the golf ball are obtained.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 7 and 8 are cancelled.

Claims 1, 9 and 10 are determined to be patentable as amended.

Claims 3-6, dependent on an amended claim, are determined to be patentable.

New claim 11 is added and determined to be patentable.

1. A golf ball comprising a cover and a clear coat applied as the outermost coat of said cover, the clear coat having [at least] *a solids content of 35-60% and having from* about 0.3% to about 1% by weight of the solids content of the clear coat of one or more optical brighteners selected from the group consisting of stilbene derivatives, styryl derivatives of benzene and biphenyl, bis(benzazol-2-yl) derivatives, cumarins, carbostyrils, pyrene derivatives of dibenzothiophene-5,5-dioxide, naphthalimides, derivatives of dibenzothiophene-5,5-dioxide, pyrene derivatives, and pyridotriazoles.

9. The golf ball of claim [7] *11* wherein the optical brightener is present in the amount of 0.6–0.8% by weight of the solids content of the clear coat.

10. The golf ball of claim [7] *11* wherein the optical brightener is present in the amount of 0.75% by weight of the solids content of the clear coat.

*11. A golf ball comprising a cover and a clear coat applied as the outermost coat of said cover, the clear coat having a solids content of 35-60% and having from at least 0.3% to about 1% by weight of the solids content of the clear coat of one or more optical brighteners.*

* * * * *